United States Patent
Nobileau

(10) Patent No.: US 7,159,666 B2
(45) Date of Patent: Jan. 9, 2007

(54) METHOD TO INSTALL A CYLINDRICAL PIPE IN A WELLBORE

(76) Inventor: Philippe Nobileau, 2 avenue Fernand Martin, Villefranche sur Mer (FR) 06230

( * ) Notice: Subject to any disclaimer, the term of this patent is extended or adjusted under 35 U.S.C. 154(b) by 229 days.

(21) Appl. No.: 10/416,772

(22) PCT Filed: Oct. 8, 2001

(86) PCT No.: PCT/FR01/03099

§ 371 (c)(1),
(2), (4) Date: May 15, 2003

(87) PCT Pub. No.: WO02/29208

PCT Pub. Date: Apr. 11, 2002

(65) Prior Publication Data
US 2004/0154810 A1    Aug. 12, 2004

(51) Int. Cl.
*E21B 23/02* (2006.01)
(52) U.S. Cl. ............................... 166/380; 166/207
(58) Field of Classification Search ................ 166/380, 166/384, 207
See application file for complete search history.

(56) References Cited

U.S. PATENT DOCUMENTS

| 3,489,220 | A | * | 1/1970 | Kinley | 166/277 |
| 5,083,608 | A |   | 1/1992 | Abdrakhmanov | |
| 5,785,120 | A | * | 7/1998 | Smalley et al. | 166/55 |
| 5,794,702 | A | * | 8/1998 | Nobileau | 166/380 |
| 5,979,560 | A | * | 11/1999 | Nobileau | 166/381 |
| 6,253,852 | B1 | * | 7/2001 | Nobileau | 166/313 |
| 6,287,335 | B1 | * | 9/2001 | Drasler et al. | 623/1.28 |
| 6,354,373 | B1 | * | 3/2002 | Vercaemer et al. | 166/277 |
| 6,401,815 | B1 | * | 6/2002 | Surjaatmadja et al. | 166/277 |
| 6,435,281 | B1 | * | 8/2002 | Baugh | 166/382 |
| 6,457,518 | B1 | * | 10/2002 | Castano-Mears et al. | 166/207 |
| 6,648,075 | B1 | * | 11/2003 | Badrak et al. | 166/381 |
| 6,708,767 | B1 |   | 3/2004 | Harrall | |
| 2002/0079106 | A1 | * | 6/2002 | Simpson | 166/380 |

FOREIGN PATENT DOCUMENTS

WO    WO 94/21887    *  9/1994

* cited by examiner

Primary Examiner—William Neuder

(57) ABSTRACT

A method to install a cylindrical pipe in a wellbore through a previously installed casing forming a reduced opening by running a pipe within the casing, the pipe having a first shape having dimensions smaller than the dimensions of the reduced opening; then deforming the pipe to convert the pipe from the first shape to a substantially cylindrical second shape in a cavity having larger dimensions than both the reduced opening and the second shape, and last displacing an expansion mandrel having a circular section to expand, in the plastic range, the pipe having a substantially cylindrical second shape to a cylindrical third shape.

21 Claims, 6 Drawing Sheets

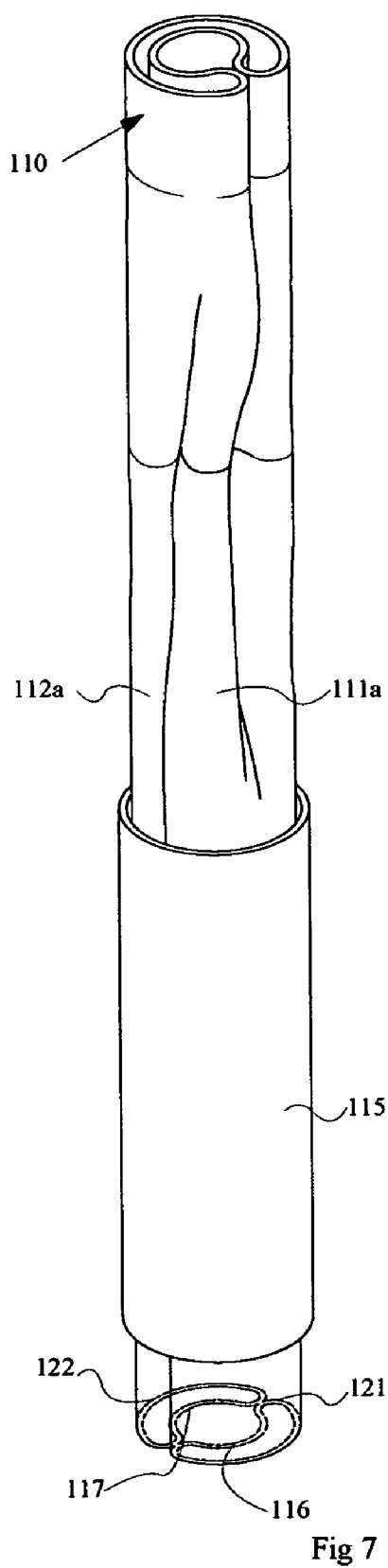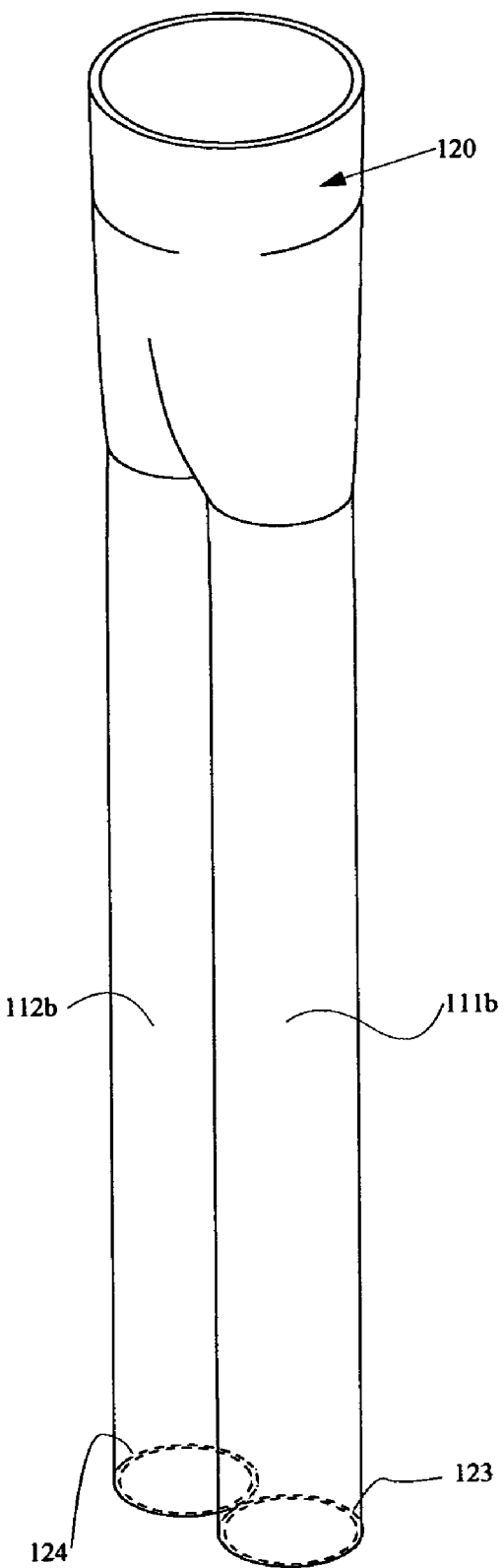
Fig 7
Fig 8

METHOD TO INSTALL A CYLINDRICAL PIPE IN A WELLBORE

TECHNICAL FIELD

This invention relates to cylindrical pipes in oil wells and in particular, a method and associated system to install a cylindrical pipe into a well through a previously installed casing forming a reduced opening, the pipe having a first shape having dimensions smaller than the dimensions of the reduced opening and then deploying adequately the cylindrical pipe in a cavity located below the previously installed casing.

BACKGROUND ART

Oil and gas wells are typically drilled by installing a conductor pipe to a first depth, then drilling the well to a second depth. Usually, a string of casing is made up by coupling together sections of pipe, each being about forty feet long, and lowering the string through the conductor pipe to the second depth. Cement is then pumped down the casing, which flows back up the annulus between the casing and the open borehole. Drilling is resumed to a third depth and the process is repeated with another smaller diameter nested casing. An even smaller diameter string of casing may be installed to a fourth depth.

Casing serves to support the wellbore and to prevent undesired outflow of drilling fluid into the formation or inflow of fluid from the formation into the wellbore from strata other than the target production strata. The nested arrangement of successively smaller casing strings requires a relatively large drilled hole at the upper part of the wellbore due to the thickness of the casing and couplings and also due to the minimum clearance necessary between casing to displace cement in the annulus space.

U.S. Pat. No. 5,794,702 discloses a continuous collapsed casing system allowing to rapidly run a continuous metallic casing into a well. The casing is plastically coiled on large reels. An injector unit straightens the casing and folds it in horseshoe shape prior to lowering it into the well as it is uncoiled from the reel. When the casing reaches the target depth, it is then reopened mechanically or hydraulically to its unfolded shape substantially cylindrical. Unfortunately due to the existence of an elastic phase in the stain-stress curve of metallic material the final second shape spring back after the expander/gauge move out and exhibit marks on the wall where the horseshoe shape folds were. The direct consequence is that the misshapen shape restricts the access and degrades the external pressure performance of the reformed or deployed cylindrical pipe.

The U.S. Pat. Nos. 5,979,560 and 6,253,852 of the inventor describe downhole well equipment comprising lowering of sections of pipe which are folded longitudinally to allow their descent in the well, then re-inflated by internal press to regain their initial cylindrical shape.

WO 99/35368 (Shell International Research Maatschappij B.V.) discloses an alternative to the collapsed casing using round cylindrical pipe. Through a previously installed casing, an additional casing having a cylindrical form of a smaller diameter can be lowered and after having reached its target depth below the previously installed casing, its diameter can be increased by stretching the wall of the pipe using an expansion mandrel. In this case an expansion mandrel is pushed or drawn through the additional casing, the expansion mandrel comprising a first diameter equal to the internal diameter of the additional casing and a second diameter equal to the internal diameter that is desired to obtain, these two diameters being connected by a truncated cone. It is on this truncated cone that the plastic expansion of the wall of the pipe occurs. The expansion factor, which is the percentage of internal diameter expansion, must be at least in the order of 15%, and it is the axial length of this cone which limits the thickness of the additional casing due to the risk of initiating cracks from micro defects in the plastically expanded zone.

These various methods thus allow the installation of tubulars of a given diameter through a previously installed casing forming a reduced opening, by requiring a plastic expansion in one single step, to obtain the tubular's final dimensions in a cavity located below the previously installed casing.

But these methods result either in an irregular section of the pipe, which keeps the fold marks made during folding, in the case the section was initially folded, or in a thickness limitation, in the case where the pipe is initially cylindrical and is simply expanded. Due to these irregularities or reduced thickness, the external pressure resistance of the cylindrical pipe is largely decreased compared to the equivalent casing installed in a traditional way, without plastic deformation.

DISCLOSURE OF INVENTION

Consequently, the aim of the invention is to provide a method and system to install a cylindrical pipe downhole without the limitations of the above methods, and also independently of the technique used to get them through the well: by folding and unfolding or by using a small pipe which is heavily expanded. This method, including an expansion, aims to improve the external pressure resistance of the cylindrical pipe by improving either the circularity of the section in case it has been folded or by allowing the use of heavier pipes in the case it has been only expanded.

The aim of the invention is thus a method allowing to install a cylindrical pipe into a well through a previously installed casing forming a reduced opening, the pipe having a first shape having dimensions smaller than the dimensions of the reduced opening, then deforming the pipe to a larger second shape substantially cylindrical in a cavity located below the previously installed casing and last expanding the deformed pipe by displacing an expansion mandrel with a circular section through the cylindrical pipe.

This method applies to the monodiameter casing system which consists in lowering a string of casing into a well through a previously installed casing of a common diameter, and enlarging this casing by unfolding and/or expanding to the common diameter.

More generally, this method applies to any portion of pipe which must temporarily pass through a restriction or an opening of smaller size during the running to the target depth and must take again by plastic deformation a final cylindrical shape larger than the dimensions of the opening by which it has to momentarily pass through.

In a characterization of the invention, the expansion mandrel will be moved by applying a pressure on the back of the expansion mandrel with the sealing device to the cylindrical pipe to be expanded being located on the small diameter of the conical portion of the expansion mandrel.

SHORT DESCRIPTION OF THE DRAWINGS

FIG. 7 is a perspective view of a folded up apparatus passing through a casing of reduced diameter.

FIG. 8 is a partial sectional perspective view of the apparatus of FIG. 6 re-inflated.

BEST MODE FOR CARRYING OUT THE INVENTION

Figure 1:
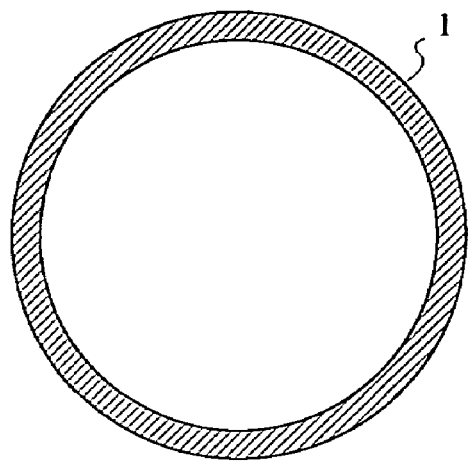
FIG. 1 is a sectional view of the initial pipe as being manufactured.
Figure 2:
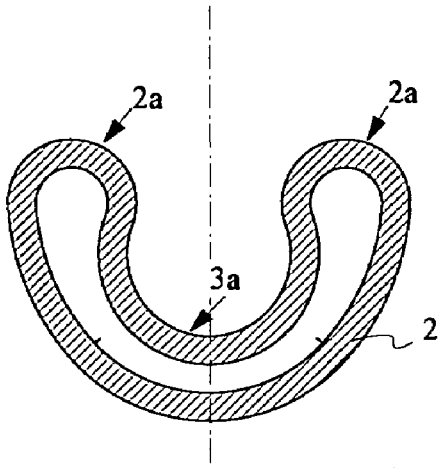
FIG. 2 is a sectional view of the pipe folded up as it is lowered into the well.

On FIG. 1, the section of pipe 1 as manufactured is circular and regular. Before being transported to the drilling site, this pipe is folded up in a U-shape 2 as illustrated on FIG. 2 to reduce its radial dimensions and to allow its passage in the previously set casing made up of same diameter casings. The casing which can have a length of a few hundred meters to thousands of meter is either continuous and rolled up on a reel in the folded up configuration, or assembled at the surface at the vertical of the well from 12 meters length of casing, folded up on almost the entire length with the exception of the ends.

Irrespective of the assembly or transportation to the drilling site, the casing is lowered into the well then re-inflated by pumping fluid into the casing. The re-inflation with pressure gives a section 3 illustrated by FIG. 3. As we can see this section is somewhat circular but irregular and presets the mark of the folds made during the folding of the section. Indeed, the convex folds 2a are found in 2b and the concave fold 3a is found in 3b. In fact, it is not the folds that stay but the ends of folds which become hard point.

If these irregularities have little effect on the interior pressure capacity of the casing, the localized existence of large radius of curvature 2c and flat part 2d affects the performances in external pressure considerably when compared to the external pressure performances of the initial casing.

Figure 5:
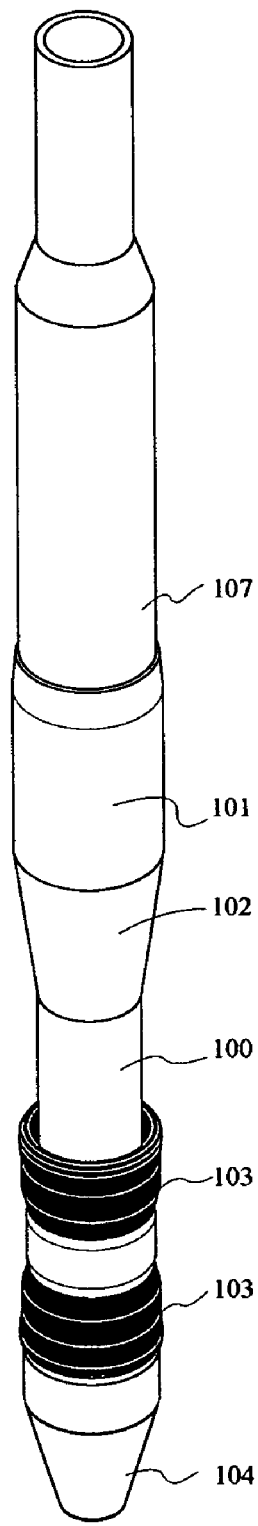
FIG. 5 is a perspective view for the expansion mandrel of the first embodiment of the invention.

On FIG. 5, the expansion mandrel 100 comprises an active part 101 materialized by a cylinder with the expansion diameter preceded by a expansion cone 102. At the top, it is connected to the bottom of the drill string 107. The expansion mandrel can thus fulfill its duty using the weight of the drillstring, increased by drill collars (not represented) to carry out the expansion phase. At last, a guide conical head 104 is located at the bottom.

In some cases, for instance when the drilling is horizontal or almost horizontal, or when applying a sufficient weight on the expansion mandrel is not practical, it could be advantageous to pump the expansion mandrel and in this case one or several high pressure cups 103 of elastomer are inserted on the expansion mandrel body usually on top of this one in order to apply a thrust on it by establishing a sliding seal with the internal surface, rough of rolling, of the casing.

Nevertheless, it can be advantageous to locate the cups 103 ahead of the expansion mandrel as illustrated on FIG. 5 so first to propel the expansion mandrel and second to use the thrust pressure to apply internal pressure on the part of pipe to be expanded. Indeed this lowers the axial thrust required by putting the casing in hoop tension and decreasing the contact forces between the casing and the cylindrical part 101 of the expansion mandrel.

Figure 3:
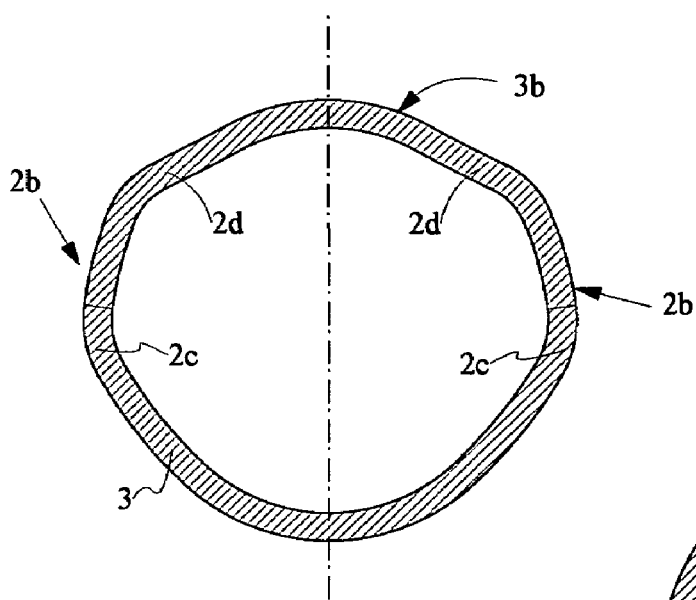
FIG. 3 is a sectional view of the pipe re-inflated by the pressure of the opening fluid.
Figure 4:
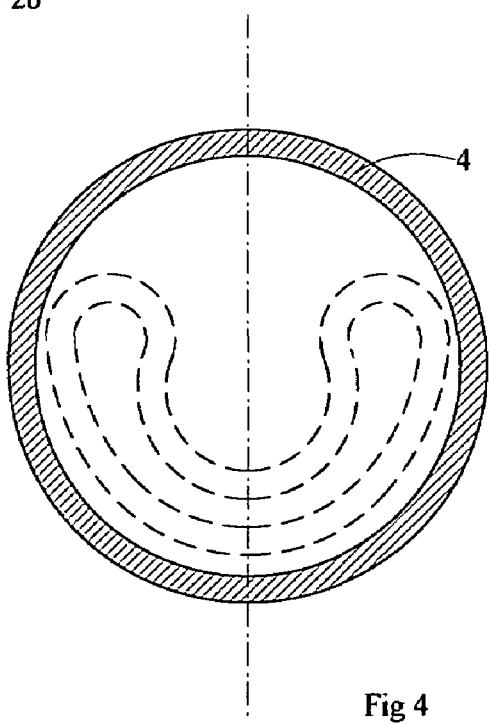
FIG. 4 is a sectional view of the slightly expanded final pipe giving a passage sufficient for the passage of the next pipe according to FIG. 2.
Figure 6:
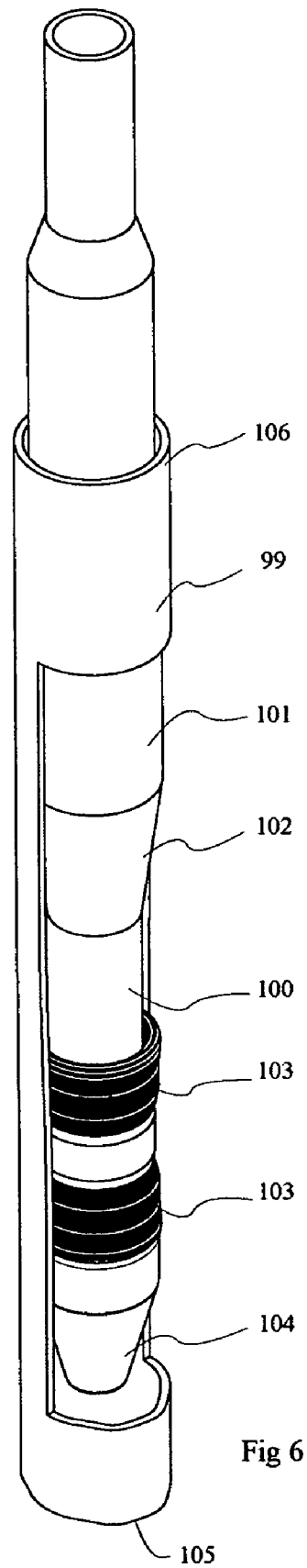
FIG. 6 is a partial sectional perspective view of the passage of the expansion mandrel for the first embodiment of the invention.

On FIG. 6, the expansion mandrel 103 is forced through casing 99 to carry out a slight expansion of the circumference of the pipe in the plastic range. The section 105 which has the shape of FIG. 3 is stretched while passing on cone 102 followed by the cylindrical part 101 and takes the shape 106 of FIG. 4. This slight expansion allows to reduce substantially the mark of the folds and in fact impose the smooth shape to the casing which takes back the shape illustrated on FIG. 4. This expansion preferably increases the length of the external perimeter of the casing by 2 to 10% (FIGS. 1 and 4) and thus in consequence the external diameter with the same ratio.

Figure 11:
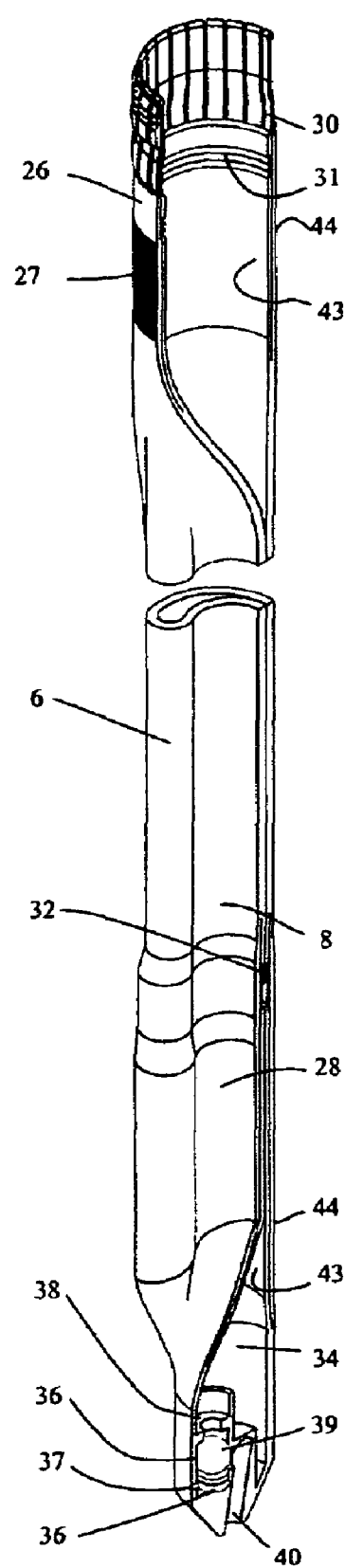
FIG. 11 is a partial sectional perspective view of a folded up casing as it is lowered.

Referring to FIG. 11, casing 6 of folded up casings is made of multiple lengths of folded up casings 8. Casing 6 comprises a top hanger 26 on top connected with lengths of casing 8 to an also folded up bottom bell 28 and a partially folded up shoe 34. The top hanger 26 comprises collet fingers 30. Hanger 26 also comprises circumferential triangular grooves 27 on its external surface. Preferably, a soft metal inlay is located in triangular bottom of groove 27 to enhance sealing. A profile with interior groove 31 is located on the internal diameter of top hanger 26 to permit connection with the running tool 50 (not shown). Casing 8 connected to the hanger 26 can extend in casing string 6 on thousands of meters.

The bottom bell 28 comprises a profile with interior groove 32 to receive the collet fingers 30 of the next top hanger 26 of the casing (not shown) which will be suspended below. The bottom bell 28 has a surface of triangular groove 29 which of similar manner cooperates with the triangular grooves 27 of the top hanger 26 of the next casing (not shown) which will be suspended below.

The cementing shoe 34 is offset from the casing 6 axis and comprises a check valve 35 with an upper sealing seat 38, a lower sealing seat 36 maintained in place by shearing pins 37, sealed in the cementing shoe 34 by seals, a floating ball 39 and one passage of fluid 40 connecting the check valve 35 to the bottom nozzle. FIG. 11 shows casing 6 and the top hanger 26 in a running configuration. The top hanger 26 and shoe 34 are not folded up. The top hanger 26 will be initially expanded to allow the descent of the running tool and expansion mandrel (not shown), then will be finally swedged to the bottom bell 28 of the previously set installed casing.

Figure 12:
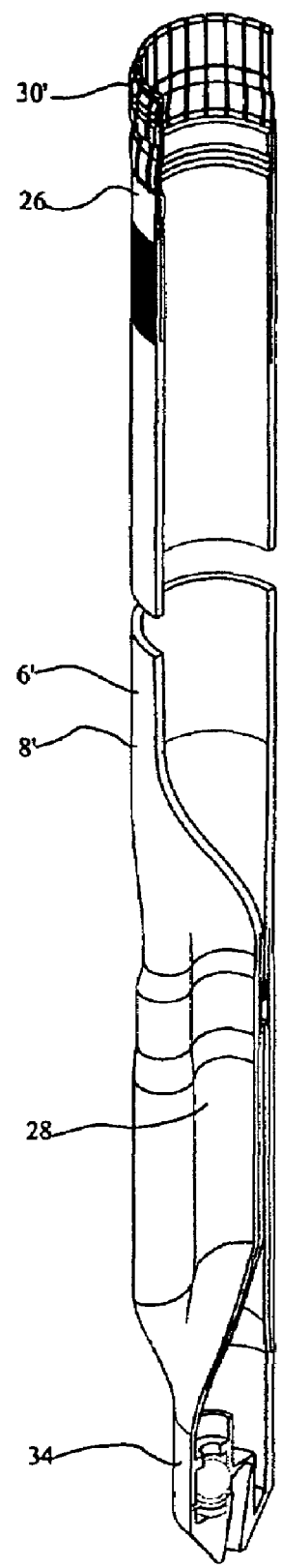
FIG. 12 is a partial sectional perspective view of an expansible casing as it is lowered.

The FIG. 12 shows the same configuration of casing as FIG. 11 with the exception that the body of the casing consists of expandable pipes 8' and not folded up 8 but we find the same expandable top hanger 26 and folded up bottom bell 28 described on FIG. 11.

Figure 13:
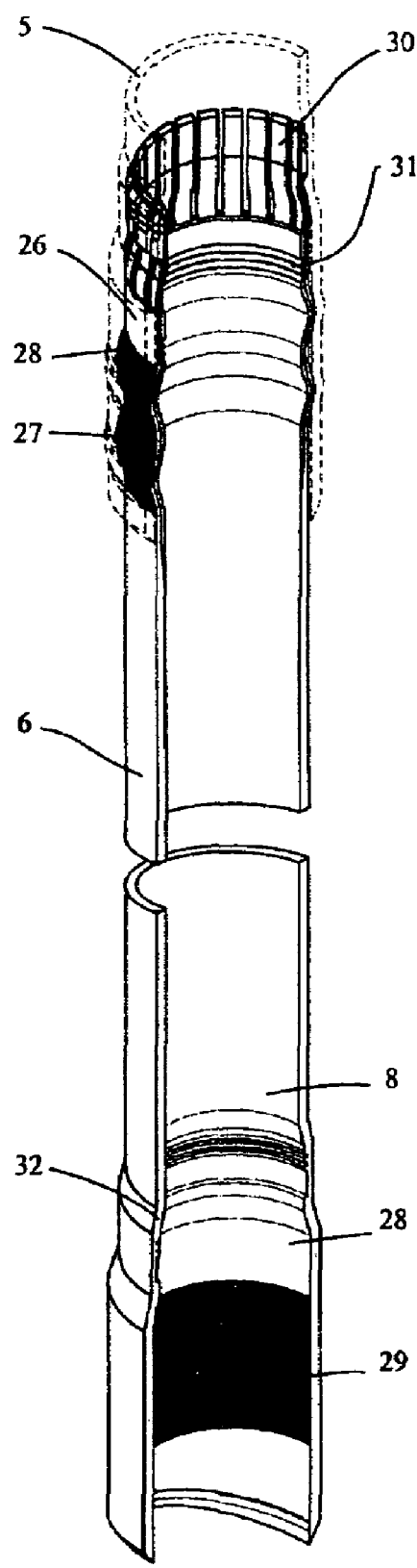
FIG. 13 is a partial sectional perspective view of the final casing with the head of casing swaged into the foot of the previously set casing and with the shoe drilled out.

Referring on FIG. 13, the top hanger 26 is suspended on previously set unfolded casing 5 by the collet fingers 30. The triangular grooves 27 were deformed to interpenetrate the triangular grooves 28 of previously set casing 5. Casing 8 was rounded.

As can be seen, a monodiameter casing system can be built around a folded up casing. The reduction of diameter for its descent through previously set casing of the same dimension can be obtained from the technique of pipe folding or the known technique of brutal pipe expansion. As we have just seen, it is advantageous to combine the techniques of folding and expanding by folding up a casing of 6⅝" to obtain a diameter external of 6" and then in the place of expansion mandrel to the same diameter to dilate it slightly to obtain a diameter of 7" (5.7% of expansion) and in consequence being able to combine the capacity of thick pipes and the limited strain of the folded up technique with the good geometry of the expanded technique. If we wanted to take a casing of 6" which passes through a casing of 7", and to expand it to obtain a casing of 7", it is an expansion of 16.7% that would be required with the limitations which were mentioned previously. We can obtain a similar result by associating a first expansion with a second one and to thus limit the value of expansion which must be carried out at once.

Despite the fact that the casings are considered as assemblies from straight lengths in the above description, continuous casings on reels as described in the U.S. Pat. No. 5,794,702 can be also used to build a system of casing "folded/re-inflated" benefiting of the external pressure enhancement from the inflation followed by a slight expansion described above.

In a second embodiment of the invention, a downhole equipment 110 (FIG. 7) comprising sections of pipe 111a and 111b is crushed with its sections of pipe folded up to allow its descent in the reduced passage of well casing 115. An example of such equipment is described in the U.S. Pat. Nos. 5,979,560 and 6,253,852.

When this equipment reaches the target depth which features a widened cavity (not shown), the equipment is re-inflated (FIG. 8) by pumping fluid which will give it a general cylindrical shape 120. But as previously said, this re-inflated shape exhibits on the straight parts of the pipes 111b and 112b of the equipment, some variations of radius localized at the previous fold location (see FIG. 3) and it is necessary to eliminate them to improve the external pressure resistance of these sections. This is carried out by a mechanical action of slight expansion mandrel (FIG. 5) such as previously described for the first embodiment which is run on drillpipe through the equipment and which enters successively the two branches 111b and 112b to carry out a slight expansion of the pipes constituting those branches.

In the case of downhole equipment 110, which comprises two branches 111 and 112, it is advantageous to fold them with a fold on each pipe 116 and 117 facing one another which gives sections 121 and 122 a U-shape face to face. The marks of the folds 116 and 117, which persists after re-inflation (FIG. 3) are completely erased by the slight expansion and the sections become again perfectly circular 123 and 124 with an increase in diameter from 2 to 10%.

Figure 9:
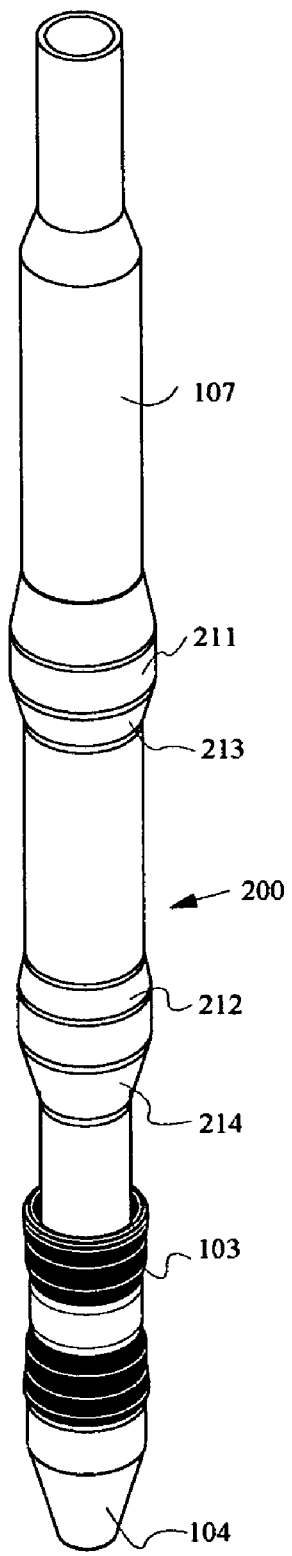
FIG. 9 is a perspective view of the double step expansion mandrel.

On FIG. 9, the expansion mandrel 200 comprises an active part 201 made up by two expansion cylinders, one having the final expansion diameter 211 and the other roughly with the intermediate diameter 212 between the final diameter and the diameter of the initial expandable casing. These diameters are preceded by two expansion cones 213 and 214 respectively. The top part is secured on the drillstring 107. The expansion mandrel can thus fulfil its duty by using the weight of the drillstring, weighed down by drillcollars (not shown) to perform the expansion task. At last a conical head 104 is located on the lower part.

In some case, for instance when the drilling is horizontal or almost horizontal, or when applying sufficient weight on the expansion mandrel is not practical, it could be advantageous to pump the expansion mandrel and in this case one or several high pressure cups 103 of elastomer are inserted on the expansion mandrel body usually on top of this one in order to apply a thrust on it by establishing a sliding seal with the internal surface rough of rolling of the casing.

Nevertheless it can be advantageous to locate the cups 103 below the expansion mandrel as illustrated on FIG. 9 in order to use the pressure thrust to apply internal pressure to the part of pipe to be expanded (206, 208). Indeed this lowers the axial thrust required by putting the casing in hoop tension and decreasing the contact forces between the casing and the cylindrical part 211 and 212 of the expansion mandrel 200.

Figure 10:
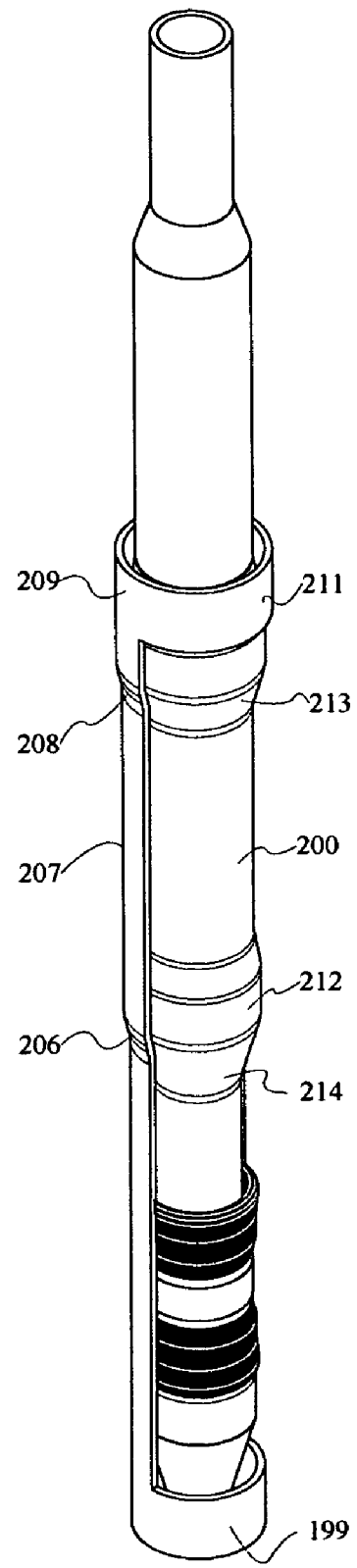
FIG. 10 is a partial sectional perspective view of the passage of the double step expansion mandrel FIG. 9.

On FIG. 10, the expansion mandrel 200 is forced through the expandable casing 199 to carry out successively two distinct expansions of the circumference of the pipe in the plastic range. The initial section 205 which is circular is stretched in the shape of cone 206 while passing on cone 214 followed by cylinder 212 and obtains the round diameter 207 then is again stretched in the shape of cone 208 while passing on cone 213 followed by cylinder 211 and obtains the round diameter 209. This expansion in two stages 206 and 208 makes it possible to expand heavier wall thickness pipe while an expansion in only one stage would require a plastic zone of the double length which would increase the possibility of longitudinal failure from the stretched area due to a defect of a given size. It is well understood that the stretched zone must be maintained in the hoop direction to avoid the formation of striction in presence of defects, while as soon as the expansion ratio is increased above 10%, the tolerance to defect is substantially decreased.

Despite the fact that the casing strings are made of coupled straight joints in the description, continuous casing on reel can also be used to obtain a monodiameter well casing system.

Consequently, one of the aim of the invention is to offer a method to improve the external pressure resistance of the pipe which must be deformed plastically to take the final shape and dimensions independently of the technique used to get them through the well. This method improves the external pressure resistance of the pipe by improving either the circularity of the section or by allowing the use of heavier pipes.

The aim of the invention is thus a method to install at least a portion of pipe of a downhole structure in a wellbore by running a deformed downhole structure through the wellbore forming a reduced opening, then deforming said portion of pipe to a first shape in a cavity larger than said reduced opening and larger than the first shape, and last expanding said portion of pipe past its elastic limit to a second cylindrical shape having an increased drifting diameter from said first shape.

This method applies to the system of casing in monodiameter which consists in lowering a string of casing into a well through a previously set casing of a common diameter, and to enlarge this casing to the common diameter.

The invention claimed is:

1. A method to install a cylindrical pipe in a wellbore through a previously installed casing forming a reduced opening, the method comprising:

a) running a pipe having a first shape within said casing, said pipe having dimensions smaller than the dimensions of said reduced opening;
b) deforming said pipe having a first shape to convert said first shape pipe to a pipe having a substantially cylindrical second shape, and;
c) expanding said second shape pipe to a cylindrical third shape by displacing an expansion mandrel having a circular section through the cylindrical pipe.

2. The method according to claim 1 wherein the deformation step is done in a cavity larger than said reduced opening and said substantially cylindrical second shape.

3. The method according to claim 1 wherein the expansion step increases the average diameter of said substantially cylindrical second shape by 2 to 10% to obtain said cylindrical third shape.

4. The method according to claim 1 wherein said substantially cylindrical second shape has a dimension larger than said reduced opening.

5. The method according to claim 1 wherein the deforming step is done by applying internal fluid pressure.

6. The method according to claim 1 wherein said cylindrical pipe is made up of a plurality of straight length of pipe.

7. The method according to claim 1 wherein said cylindrical pipe is a continuous length of pipe stored on a reel prior to installation.

8. The method according to claim 1 wherein said cylindrical third shape has a increased drifting diameter from said substantially cylindrical second shape.

9. The method according to claim 1 wherein said cylindrical third shape has a increased drifting length from said substantially cylindrical second shape.

10. The method according to claim 2 wherein said first shape is cylindrical and the deformation step is done by displacing a second expansion mandrel of smaller diameter.

11. The method according to claim 10 wherein both said expansion mandrels are displaced together.

12. The method according to claim 2 wherein said expansion mandrel displacement is done by locating at least one high pressure cup on said expansion mandrel in sliding sealing arrangement with the internal surface of said pipe having a substantially cylindrical second shape and by applying internal fluid pressure in said pipe on the back side of said expansion mandrel with regard to the displacement direction.

13. The method according to claim 12 wherein said high pressure cup are located on the front end of said expansion mandrel with regard to said displacement direction.

14. The method according to claim 1 wherein said cylindrical pipe is attached to a non cylindrical portion of a downhole equipment.

15. The method according to claim 1 wherein two cylindrical pipes are installed concurrently side by side.

16. A method to install at least a portion of tubular pipe of a downhole structure in a wellbore, the method comprising:
a) running a portion of pipe of said downhole structure through said wellbore forming a reduced opening;
b) deforming said portion of pipe of a downhole structure to a first shape in a cavity larger than said reduced opening and larger than said first shape, and;
c) expanding said portion of pipe of a downhole structure having the first shape past its elastic limit to a second cylindrical shape having an increased drifting diameter with respect to said first shape.

17. The method according to claim 16 wherein the expansion step reduces the out of roundness of the section of said portion of tubular pipe having the first shape for enhancing external pressure resistance of said portion of tubular pipe.

18. The method according to claim 16 wherein the deformation step is done by displacing an opening tool through said portion of a downhole structure and the expansion step is done by displacing an expansion mandrel through said portion of a tubular pipe having the first shape.

19. The method according to claim 18 wherein said opening tool and said expansion mandrel are displaced together.

20. A method to install at least a portion of cylindrical pipe in a wellbore, the method comprising:
a) running a pipe having a folded first section;
b) deforming said folded first section to a substantially circular second section having a first perimeter, and;
c) expanding said second section to a circular third section having a second perimeter larger than said first perimeter by displacing a cylindrical expansion mandrel through said second section.

21. A method to install at least a portion of cylindrical pipe in a wellbore, the method comprising:
a) running a pipe having a first circular section;
b) expanding said section to a circular second section having a first perimeter, and;
c) expanding said section having a first perimeter to a circular third section having a second perimeter larger than said first perimeter by displacing an expansion mandrel through said section having a first perimeter.

* * * * *